Jan. 25, 1966 J. K. WILLIS 3,231,807

INTEGRAL MOTOR-TACHOMETER SYSTEM

Filed Dec. 18, 1962 2 Sheets-Sheet 1

JACK K. WILLIS
INVENTOR.

BY Robert G. Clay

ATTORNEY

INTEGRAL MOTOR-TACHOMETER SYSTEM

Filed Dec. 18, 1962

2 Sheets-Sheet 2

JACK K. WILLIS
INVENTOR.

BY Robert G. Clay

ATTORNEY

United States Patent Office 3,231,807

Patented Jan. 25, 1966

3,231,807

INTEGRAL MOTOR-TACHOMETER SYSTEM

Jack K. Willis, San Bruno, Calif., assignor to Ampex Corporation, Redwood City, Calif., a corporation of California Filed Dec. 18, 1962, Ser. No. 245,582
6 Claims. (Cl. 318—313)

This invention relates to systems for sensing or controlling motor speeds, and more particularly to systems for achieving extremely precise control of magnetic tape drives.

Many electromechanical systems are known which operate to sense the speed of a rotating member and which generate a control signal representative of the speed of the member, which control signal may be fed back to maintain the speed at a desired rate or within desired limits. Many tachometer generators and servo systems are known for this purpose, and various other error signal generators will also suggest themselves to those skilled in the art.

Known speed control systems of this nature for governing the speed of rotating drive members operate with moderate degrees of precision. A number of modern systems, however, require degrees of precision which far exceed the levels obtainable with most current systems. Modern magnetic tape systems, for example, are used for accurately recording and reproducing analog or digital signal data. In order to achieve high information rates and provide wideband recordings, such systems must operate with high relative head to tape speeds. Thus it is common, when recording a frequency band covering one megacycle, to use tape speeds of 120 inches per second. Similarly, in recording digital data with high density, speeds of 150 inches per second are common. High density recording techniques, moreover, demand highly precise speed control for virtually all conditions of operation, because minute mechanical displacements result in the introduction of very great variations into electrical signals. At all times during both recording and reproducing, therefore, the speed of the tape and the driving member must be monitored and corrected with a high degree of precision.

Such requirements create a need for controlled speed driving mechanisms which are substantially free of mechanical errors which might otherwise be tolerable. Errors of micro-inches must now be considered as significant because of the disruption which they can introduce into analog or digital signal information. Errors of this magnitude are found in all mechanical coupling arrangements, and are introduced by many different dynamic effects. A tachometer which is coupled by a gear drive to a motor, for example, would be subject to error in representing the instantaneous position and the speed of the motor because of mechanical slippage and frictional effects. Moreover, the tachometer would be unlikely to be able to provide an adequately fine resolution of rotational position. Furthermore, such errors as those introduced by torsion in the shaft between the rotor of the motor and the tachometer during rotation become significant in these applications.

It is therefore an object of the present invention to provide improved and extremely precise controlled electromechanical driving systems.

A further object of the present invention is to provide an improved system for determining rotational position and speed of a driving member.

A further object of the present invention is to provide an improved tachometer system for a motor drive for modern magnetic tape systems.

Systems in accordance with the present invention utilize an integral combination of a readily controllable motor and a lightweight, high resolution signal generator forming an integral part of the motor. An indicia bearing member peripherally disposed about the rotor of the motor and having sensing elements contained within the motor housing provides an exact representation of instantaneous rotor position without materially increasing the moment of inertia, and without introducing any drag in the motor movement.

In a preferred form of system in accordance with the invention, the rotor is disposed as a relatively thin disc rotatable on a central shaft and having windings etched or deposited on the flat surface of the rotor and in energy interchange relation with magnetic pole members. The outer periphery of the rotor terminates in a thin annulus which is affixed thereto and which includes a photographically affixed (for example) index pattern having extremely fine incremental indicia. Photoelectric sensing means are disposed within the motor housing adjacent the indicia ring. During rotation of the rotor, the photoelectric sensing means continually generates a high frequency signal, the instantaneous frequency of which is substantially representative of the instantaneous speed of rotation of the rotor. Concurrently, the rotor design is particularly suitable for operation at highly changing rates of acceleration and frequency.

A better understanding of the invention may be had by reference to the following description, taken in conjunction with the accompanying drawings in which.

The present invention may be utilized in both open and closed loop control systems. A leading example of application of the invention is found in the art of magnetic tape transports, and accordingly the invention is described in that context.

Figure 1:
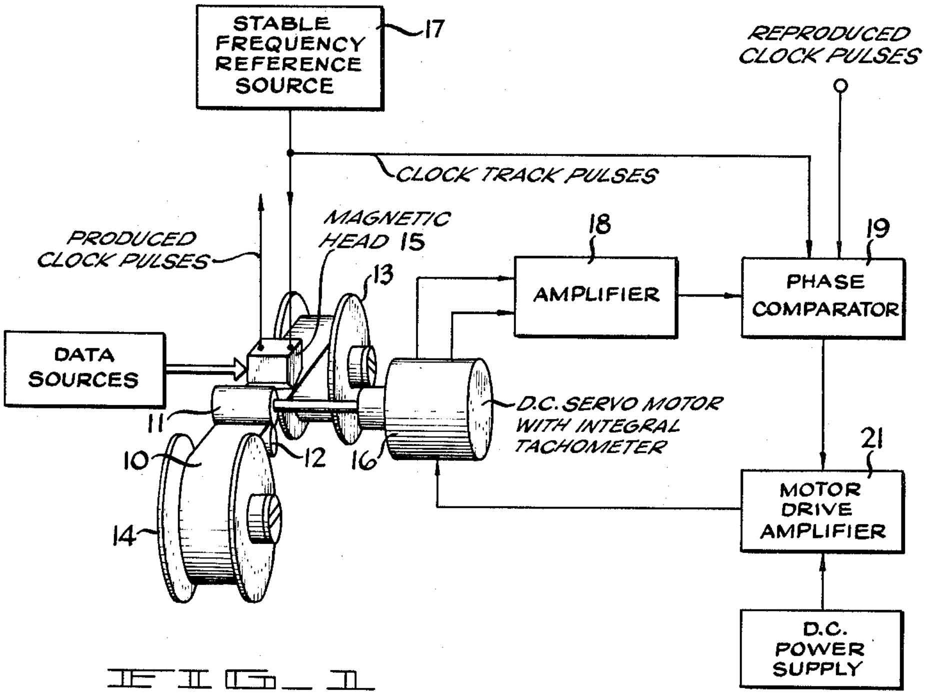
FIGURE 1 is a block diagram and partial perspective representation of the principal elements of a drive control system in accordance with the invention.

In a typical magnetic tape instrumentation recorder, the principal elements of which are shown generally in FIGURE 1, a magnetic tape 10 is transported by the action of a drive capstan 11 and pinch roller 12 between a pair of reels 13 and 14, one of which acts as a supply reel and the other of which serves as a takeup reel for the principal direction of tape advance. The tape may be supported by guide and idler mechanisms (not shown) so as to be constrained to move in a precise path adjacent the magnetic head system 15. For simplicity, a single head arrangement 15 is shown, although it will be appreciated that systems of this type usually have multiple parallel heads and may employ separate heads for recording, reproducing and erasing.

It is assumed that the system of FIGURE 1 is a wideband recording system, and that the tape 10 is to be driven with a minimum of speed variation at a selected rate of speed. The rate may be high or low, depending upon the bandwidth it is desired to encompass. During this recording, conventional techniques may be used to add a synchronizing track, to which reference may be made during reproduction in order to precisely recreate the original time base. Accurate sensing and control of the speed of a motor for the drive capstan 11 is extremely useful in a number of different applications. If the capstan speed can be held to very close tolerances during recording, and during reproduction, a minimum of additional speed correction circuitry will be needed to established a precise time base. This can be done by electronically comparing the frequency of the signal drive, as by sensing the motor speed, to an ultra-stable frequency signal, and making appropriate speed corrections, either by a closed or open loop system.

The same precise time base stability also becomes useful in digital recording systems. Here, however, movement of the tape is essentially discontinuous, in contrast to the essentially continuous tape movement which is used in analog and instrumentation recorders. Minimization of start and stop times and distances is essential to most digital data tape transports. The capability of accurately monitoring speed without introducing an added inertial factor not only permits reduction of the margin which must be related to start and stop times, but permits accurate analysis and improvement of start and stop transients and characteristics.

In the system of FIGURE 1, a closed loop magnetic tape control system is shown for operation of the tape system in the recording mode. A capstan drive motor 16 is coupled to drive the capstan 11 and the tape 10 at very closely controlled rates of speed in this mode. It is desired that speed be held within much closer limits than is feasible with a conventional synchronous motor, for example, one operated from a 60 c.p.s. supply. Accordingly, the speed of rotation of the motor 16 should be sampled at a high rate, for comparison with signals from a highly stable frequency reference source 17 and used for generation of a suitable error signal for control purposes. In systems in accordance with the present invention, a photoelectric signal generating system including a member coupled directly to the rotating member of the capstan motor 16 generates an extremely high frequency signal. This signal represents, by variations in frequency, the variations in motor speed. In another sense, it provides an extremely fine resolution of the rotational position of the rotor.

The signal components which are representative of actual speed of rotation of the capstan drive motor 16 are amplified by amplifier 18 and compared to the reference signals in a phase comparator 19, and the error signal generated thereby is applied through a conventional servo amplifier 21 as a correctional signal. Concurrently, the reference signal may also be recorded on the tape 10 to provide a reference which may be utilized during operation in the reproduction mode.

Figure 2:
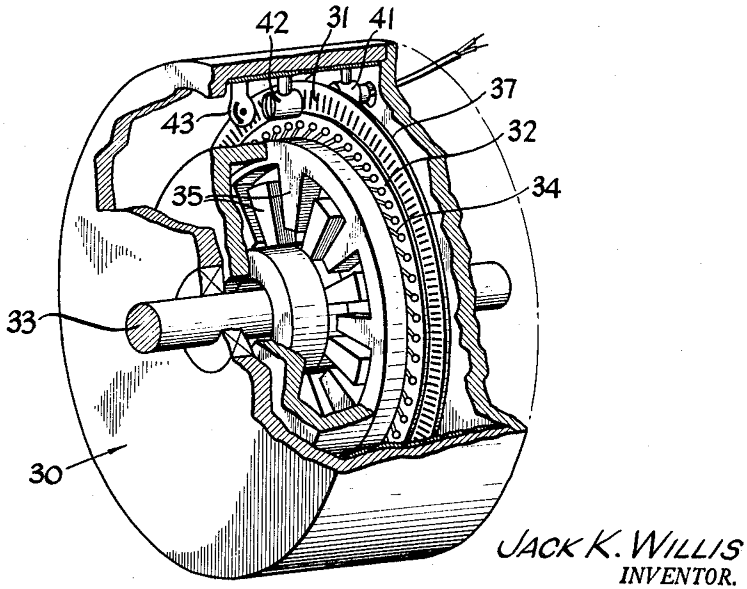
FIGURE 2 is a perspective view of a motor arrangement in accordance with the invention with a portion of the motor casing removed to show the internal structural elements.
Figure 3:
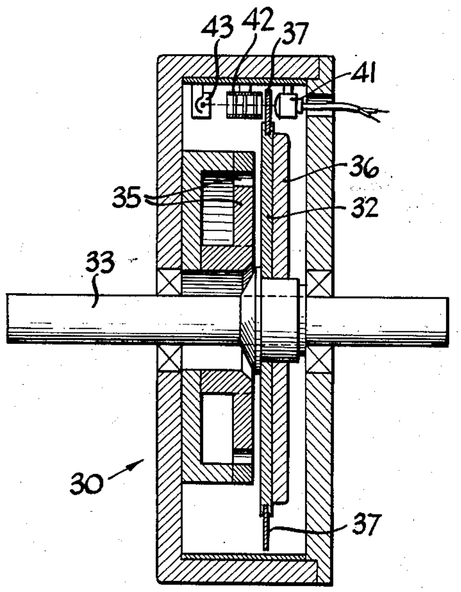
FIGURE 3 is a side sectional view of an arrangement in accordance with the invention.
Figure 4:
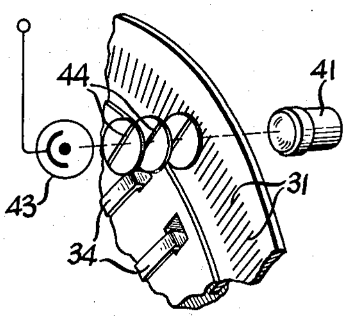
FIGURE 4 is an enlarged fragmentary view of a portion of a disc rotor and photoelectric indexing means as employed in the mechanism of FIGURES 2 and 3.

The preferred type of capstan motor 30, together with the integral index pattern 31 and associated signal generating elements, may best be seen in FIGURES 2 and 3. The motor 30 is of the printed circuit type, having a flat disc rotor 32 mounted on a central shaft 33 within the motor casing with the rotor 32 having etched or deposited winding patterns 34 extending generally radially outward. Stationary magnetic pole elements 35 facing but spaced apart from the rotor disc 32 provide magnetic flux patterns which are intersected by the rotor windings 34. Contact elements (not shown) coupled to a D.C. supply and in operative engagement with the selected areal segments of the rotor circuits provide driving power and the needed energy interchange with the magnetic fields to generate rotational motion. The D.C. magnetic fields are of extremely high density and the energy interchange relation between the rotor and stator fields is extremely efficient, but the inertia and mass of rotor 32 are relatively very low. This means that the rotor 32 can be accelerated and decelerated rapidly, and that very rapid speed changes can be effected even at high rotational speeds. The efficiency of energy interchange can be further enhanced by provision of a magnetic backing material 36 provided on the opposite face of the rotor disc 32 to complete the magnetic field on the opposite side of the winding patterns 34. Accordingly, variations of drive current can be used to achieve motor responses as high as 3 or 4 kilocycles per second without difficulty. The motor 30 can therefore theoretically be held in synchronism with a reference signal at this frequency, although the reference would necessarily have to be at a considerably higher frequency for full utilization of the motor response capability. The theory of operation of similar printed circuit motors is more fully explained by reference to U.S. Patent No. 2,970,238.

The indexing pattern 31 at the outer periphery of the rotor 32, together with its associated sensing device, provides the sought-for resolution. By preparation of a master having approximately 35,000 total increments about a circumference corresponding to that of the outer rotor ring 37, a corresponding pattern may be introduced from this master onto the outer rotor ring 37 simply by contact printing. The desired indicia pattern 31 may be introduced on a master by such conventional techniques as precision mechanical scribing on an expanded scale or electronic exposure of selected areas on a photographic plate by bombardment with a finely focused electron beam which is precisely positioned at different radial positions to produce successive contrast regions. Whatever techniques are used, a minimum of preparation of the rotor 32 itself is needed once the master is prepared.

The indicia bearing outer ring member 37 may be a separate ring affixed to the periphery of the rotor. It is preferred, however, to utilize a fiber-glass-reinforced, resin-impregnated rotor. This provides a lightweight high strength structure which may include an indicia bearing member as an integral part. The fiber glass reinforcement is terminated short of the indicia 31, so that the outer annular part 37 on which the indicia 31 are placed is made only of a thin transparent synthetic resin material. This may be prepared for the reception of the indexing pattern 31 simply by an addition of a photosensitive layer which may be exposed under the master and developed in the usual way.

With a rotor of, for example, 5 inches in diameter, the outer annulus 37 may be less tha one inch in radial extent, with a slight further spacing from associated rotor elements. This may readily be enclosed in the motor housing without special modification.

In addition to the insignificant mass and inertia provided, this construction involves a photoelectric sensing system which leaves the rotor completely free from all external drag. The circumferential pattern divisions 31 are extremely fine, and for proper resolution of the patterns, emanations from a light source 41 are passed through a collimating device 42 so that the phototube 43 is sensitive only to a very narrow radial line of light having a width less than one of the indexing marks of the pattern 31. The collimating device 42 may consist of a series of collimating slits 44 suitably held in place on either or both sides of the transparent outer annulus 37. Preamplifiers and associated processing circuitry coupled to receive electrical signals generated in the phototube 43 have not been shown in detail for simplicity.

Figure 6:
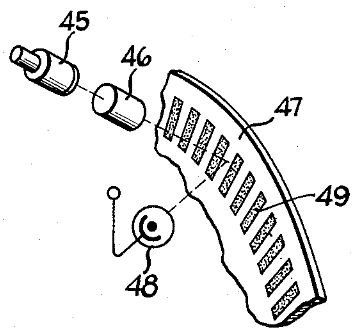
FIGURE 6 is a greatly enlarged fragmentary view illustrating a portion of the disc rotor and a reflective photoelectric indexing arrangement.

It should be recognized that various other photoelectric and electron beam sensing systems may be employed with equal advantage with an appropriate indexing pattern. FIGURE 6 illustrates a reflective arrangement wherein a light beam source 25 is positioned with a collimating device 46 to bounce a beam of light from an opaque reflective surface on the outer annulus 47 to be received by a phototube 48. The indexing marks 49 in this case have contrasting reflective properties, which in the case of the light beam would be darker areas for absorbing the normally reflected light rays.

Under all conditions of operation, therefore, the resolution system generates a periodic electrical signal from the output of the phototube 43 or like receiving electrode which accurately resolves the instantaneous rotor speed (and therefore the tape speed). The phase comparator 19 is very sensitive to variations in frequency of the phototube signal from the standard frequency of the stable source 17, and thus recording speed can be held very closely to the desired time base. Even at very low tape speed (a frequency divider coupled to the stable source 17 may be used with tape speed reductions unless reductions are effected by mechanical gearing), the resolution is sufficiently fine to virtually eliminate wow and other slow term recording errors. Therefore, the time base error may be held within a range over which electronically adjustable delay line techniques may fully compensate for the errors.

Figure 5:
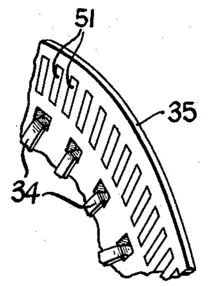
FIGURE 5 is an enlarged fragmentary view of a portion of a disc rotor illustrating an index pattern formed by deposition processes.

Modern printed circuit etching and deposition techniques are suitable for providing the finely divided indexing pattern 31 along with the electrical winding pattern 34 on the rotor. A fragment of a rotor disc prepared in this manner is illustrated in detail in FIGURE 5. Here again the light path would be through the base member (outer rotor segment 37), but the radial transmissivity portions are provided by the minute metallic conductive segments 51. If the rotor housing is evacuated of air, of course, readout of much finer gradations may be accomplished by a focused electron beam directed toward a target electrode through the patterns. As is well known, the focused electron beam can also be used in reflective techniques for generation of signals. This system would be similar to the light reflective technique shown in FIGURE 6, wherein a collimated light beam is replaced by a fine electron beam reflected off a small area on the indexing pattern toward a shielded target electrode element.

While there has been described particular embodiments of a motor control system according to the invention, it will be understood by those skilled in the art that the foregoing and other changes in form and details may be made therein without departing from the spirit and scope of the invention.

What is claimed is:

1. A motor speed control system comprising:

a motor including a shaft and a rotor in the form of a disc having a small moment of inertia mounted on said shaft;

a load coupled to said shaft so as to be driven thereby;

indicia means circumferentially disposed about the disc rotor and having varying transmissivity patterns thereon;

sensing means disposed adjacent the indexing means for sensing the transmissivity patterns and for producing a signal frequency proportional to the speed of the rotor;

reference signal generating means providing a stable reference frequency;

means for comparing the proportional signal frequency to the reference signal frequency; and means responsive to said comparing means for adjusting the speed of the motor.

2. A motor speed control system, comprising:

a printed circuit motor including a disc-like rotor having windings imprinted thereon, and a shaft mounting said rotor and coupled to a load for driving same;

tachometer indicia means formed on the periphery of said disc-like rotor;

tachometer sensing means disposed adjacent said rotor for sensing said indicia means and for producing a signal frequency proportional to the speed of the rotor; and means for receiving said signal frequency coupled to said motor for maintaining said rotor at a predetermined speed.

3. A motor speed control system, comprising:

a printed circuit motor including a disc-like rotor having windings imprinted thereon, a shaft mounting said rotor and coupled to a load for driving same, a stator mounting said shaft and electromagnetically driving said rotor and shaft, and housing enclosing said stator, said rotor and a portion of said shaft;

tachometer indicia means formed on the periphery of said disc-like rotor;

tachometer sensing means disposed within said housing and adjacent said rotor for sensing said indicia means and for producing a signal frequency proportional to the speed of the rotor;

reference signal generating means providing a stable reference frequency;

means for comparing the proportional signal frequency to the reference signal frequency; and means responsive to said comparing means coupled to said motor for maintaining said rotor at a predetermined speed.

4. A motor speed control system, comprising:

a printed circuit motor including a transparent disc-like rotor having windings imprinted thereon, a shaft mounting said rotor and coupled to a load for driving same, a stator element mounting said shaft and electromagnetically driving said rotor and shaft, and a housing element enclosing said stator, said rotor and a portion of said shaft;

said disc-like rotor being provided with peripherally disposed and equally spaced opaque sections composed of etched electro-deposited electrically conducting material;

light source means mounted within said housing element and affixed to one of said elements for directing a collimated beam of light of less width than any one of said opaque sections toward one side of the periphery of said disc rotor to impinge alternately on said opaque sections and said transparent rotor in rotation;

photosensitive means mounted within said housing element and affixed to one of said elements on the opposite side of the periphery of said rotor for receiving said beam after passage through said transparent rotor and for delivering an output signal of frequency proportional to the speed of rotation of said rotor;

reference signal generating means providing a stable reference frequency;

means for comparing the proportional signal frequency to the reference signal frequency; and means responsive to said comparing means and coupled to said motor for maintaining said rotor at a predetermined speed.

5. A motor speed control system, comprising:

a printed circuit motor including a disc-like rotor having windings imprinted thereon, a shaft mounting said rotor and coupled to a load for driving same, a stator element mounting said shaft and electromagnetically driving said rotor and shaft, and a housing element enclosing said stator, said rotor and a portion of said shaft;

said disc-like rotor being provided with peripherally disposed and alternating light reflecting and non-reflecting sections;

light source means mounted within said housing element and affixed to one of said elements for directing a collimated beam of light of less width than any one of said sections toward one side of the periphery of said disc rotor to impinge alternately on said reflecting sections and said non-reflecting sections during rotation of said rotor;

photosensitive means mounted within said housing element and affixed to one of said elements for receiving said beam after the reflection thereof from said reflecting sections and for delivering an output signal of frequency proportional to the speed of rotation of said rotor;

reference signal generating means providing a stable reference frequency;

means for comparing the proportional signal frequency to the reference signal frequency; and means responsive to said comparing means and coupled to said motor for maintaining said rotor at a predetermined speed.

6. A motor control system, comprising:

a printed circuit motor including a disc-like rotor having windings imprinted thereon, and a shaft mounting said rotor and coupled to a load for driving same;

tachometer indicia means formed on the periphery of said disc-like rotor; and tachometer sensing means disposed adjacent said rotor for sensing said indicia means and for producing a signal frequency proportional to the speed of the rotor.

References Cited by the Examiner

UNITED STATES PATENTS

| | | | |
|---|---|---|---|
| 2,769,949 | 11/1956 | Stratton | 318—318 X |
| 3,005,940 | 10/1961 | Johnson | 318—313 X |
| 3,016,428 | 1/1962 | Kabell et al. | 318—314 X |
| 3,159,777 | 12/1964 | Manteuffel | 318—138 |

FOREIGN PATENTS

| | | |
|---|---|---|
| 503,944 | 6/1951 | Belgium. |

ORIS L. RADER, *Primary Examiner.*

S. GORDON, *Assistant Examiner.*